United States Patent [19]
Magno, Jr.

[11] Patent Number: 5,806,555
[45] Date of Patent: Sep. 15, 1998

[54] LOCKING DEVICE FOR VALVES

[75] Inventor: Jose D. Magno, Jr., North Hollywood, Calif.

[73] Assignee: Spears Manfacturing Co., Symar, Calif.

[21] Appl. No.: 791,940

[22] Filed: Jan. 31, 1997

[51] Int. Cl.⁶ .................................................. F16K 35/00
[52] U.S. Cl. ................... 137/385; 70/178; 70/180
[58] Field of Search .............................. 137/385; 70/178, 70/179, 180

[56] References Cited

U.S. PATENT DOCUMENTS

| | | |
|---|---|---|
| 7,587 | 4/1850 | Hall . |
| 566,932 | 9/1896 | Patrick . |
| 674,582 | 5/1901 | Lewy . |
| 725,290 | 4/1903 | Speer . |
| 812,021 | 2/1906 | Dahl . |
| 994,409 | 6/1911 | Kelly . |
| 999,983 | 8/1911 | Gardner .................................. 137/385 |
| 1,158,631 | 11/1915 | Caldwell . |
| 1,683,649 | 9/1928 | Belote . |
| 3,112,636 | 12/1963 | McIntyre . |
| 3,156,256 | 11/1964 | Weaver . |
| 3,284,121 | 11/1966 | Lyon . |
| 3,572,063 | 3/1971 | Foote . |
| 3,960,168 | 6/1976 | Plympton . |
| 3,980,099 | 9/1976 | Youngblood . |
| 4,300,373 | 11/1981 | Camos et al. . |
| 4,982,985 | 1/1991 | Atlas . |
| 5,058,622 | 10/1991 | Chitty, Jr. et al. . |
| 5,092,359 | 3/1992 | Wirth et al. . |
| 5,412,962 | 5/1995 | Thompson . |

FOREIGN PATENT DOCUMENTS

| | | |
|---|---|---|
| 473471A | 3/1992 | European Pat. Off. . |
| 2576646 | 1/1986 | France . |
| 516634 | 1/1931 | Germany . |
| WO8302975 | 9/1983 | WIPO . |

*Primary Examiner*—A. Michael Chambers
*Attorney, Agent, or Firm*—Sheldon & Mak

[57] ABSTRACT

A locking device for use on valves such as ball valves having a body and a rotatable handle on the body comprises a first body half, a second body half, and a hinge pivotally connecting the first and second body halves together such that the locking device is positionable in open and closed positions on the valve. A body opening is formed in the first and second body halves to receive the valve body in the closed position. First and second handle openings are formed in the first and second body halves to receive the valve handle, and substantially prevent the handle from being rotated, in respective first and second positions of the handle. The handle is externally visible in both positions. A locking mechanism is provided on the first and second body halves to retain the locking device in the closed position. A lock can be used to prevent the locking device from being removed from the valve without permanently damaging the locking device.

26 Claims, 3 Drawing Sheets

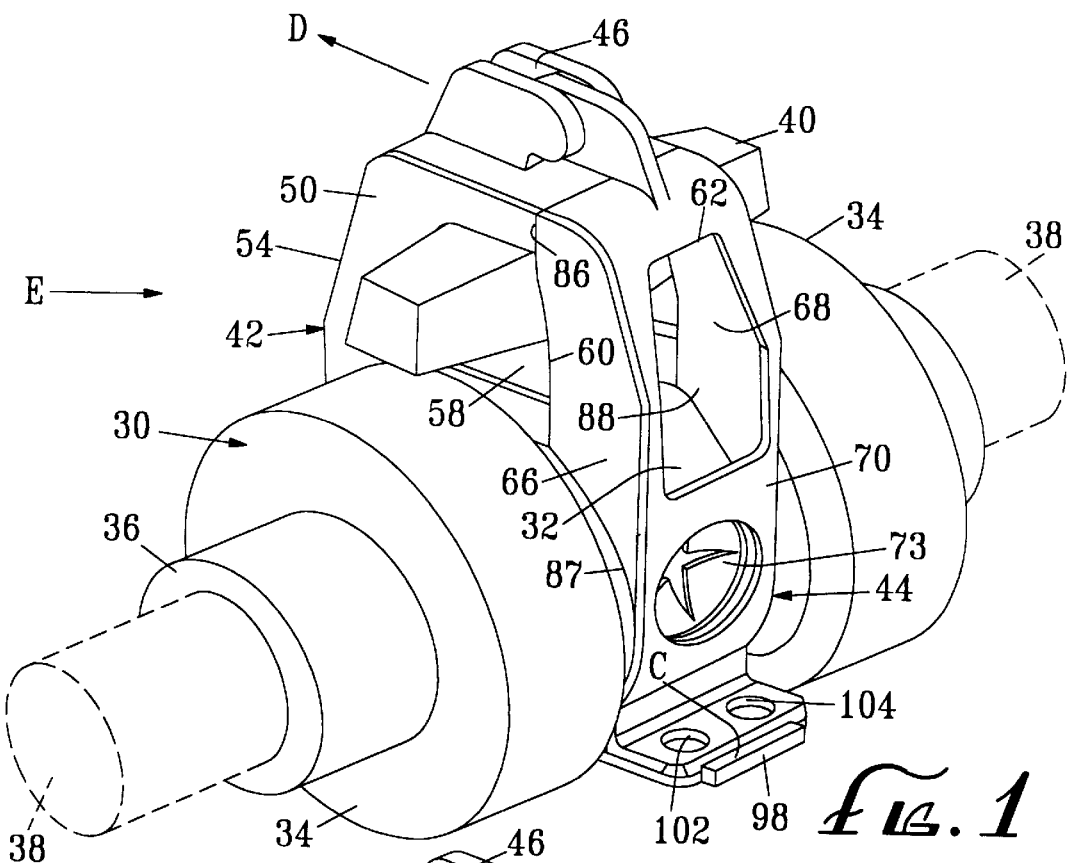
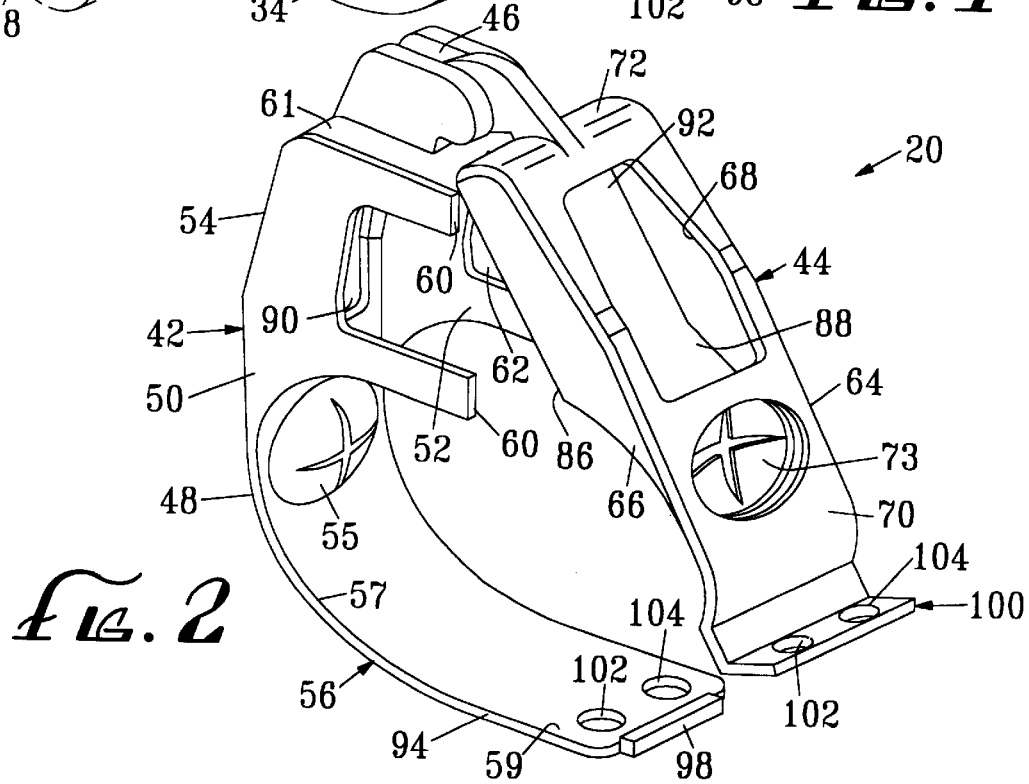

LOCKING DEVICE FOR VALVES

BACKGROUND

The present invention is directed to the field of fluid control valves and, more particularly, to a locking device for use on such valves to prevent turning of the valve handle from a set position.

Valve locking devices are used on fluid control valves such as ball valves to prevent unauthorized changes of valve preset positions. For example, locking devices are installed on closed isolation valves to prevent the valves from being opened during the performance of maintenance or service work on an associated manifold.

Occupational Safety and Health Administration (OSHA) regulation 29 CFR § 1910.147 relates to safety requirements for the control of hazardous energy. This regulation establishes procedures to disable machinery or equipment and prevent the release of potentially hazardous energy while maintenance and service work are being performed. The regulation requires, inter alia, that an energy source having a line valve that is capable of being locked out must be locked out to insure that equipment being controlled cannot be operated until the lockout is removed. A lockout is defined in the regulation as a positive means such as a lock to hold an energy isolating device in the safe position and prevent energizing of machinery or equipment. The regulation requires, for example, that a valve installed on a pipeline carrying an energy source to machinery or equipment must include some device so that the valve can be locked in the closed position during maintenance or service.

Ball valves are commonly used on pipelines to control fluid flow. Known locking devices that are used on ball valves are constructed to prevent the valve handle from being accidentally rotated, or intentionally rotated by tampering, from the set position. To achieve this objective, some known locking devices completely enclose the valve handle to prevent any access to the handle. These locking devices typically must be unlocked and then opened or removed from the valve to see the handle position. Accordingly, these locking devices do not allow visual verification of the handle position from a distance. This is a significant disadvantage in piping systems including a large number of valves and locking devices.

In addition, some known locking devices can be easily removed along with the valve handle from the valve by pulling on the locking device. Once the locking device is removed, the valve stem can then be rotated in an unauthorized manner using a tool such as pliers to change the valve setting, and the handle and locking device can then be replaced back on the valve without leaving evidence that tampering occurred. Some of these locking devices can even be removed from the valve by accidental contact with the locking device.

Other known locking devices allow at least a portion of the handle to be seen in either the open or the closed position when installed on a valve. For example, the handle may be visible in the open position, but completely enclosed by the locking device in the closed position. Some of these locking devices have the additional disadvantage of not preventing the handle from being rotated when it is in the unlocked position.

Other known locking devices are provided as components of handle kits for use on valves. Some of these locking devices allow the handle to be seen when the locking device is installed, but are constructed to be used only with the specially constructed handle included in the kit. Accordingly, these locking devices are not designed to be used on valves having other handle constructions.

Also, some known locking devices are difficult to install on valves in tight spaces such as adjacent to valve boxes, walls and machinery, due to the constructions of the locking devices. For example, some known locking devices are relatively bulky and occupy a significant amount of space around the valve body.

Thus, there is a need for a locking device for use on valves such as ball valves that (i) provides protection against tampering; (ii) allows the valve handle to be seen when installed on a valve; (iii) remains on the valve once installed; (iv) can be installed on valves located in tight spaces; and (v) is easy to manufacture.

SUMMARY

The present invention provides an improved locking device for use on fluid control valves such as ball valves that satisfies the above-described needs. More specifically, the locking device (i) substantially prevents turning of the valve handle in both the open and closed positions of the handle; (ii) only partially encloses the valve handle so that the handle can be readily seen in both the open and closed positions of the handle; (iii) cannot normally be accidentally dislodged from the valve and, when used in combination with a conventional lock, cannot be removed from the valve without damaging the locking device; (iv) has a compact construction that allows the locking device to be installed on valves located near obstacles; (v) can be formed as a single-piece construction that does not require assembly during manufacturing; and (vi) is constructed to be installed on different types of ball valves having different body configurations.

The locking device according to the present invention is constructed for use on valves including a valve body and a handle on the valve body which rotates between first and second positions. The valve is typically a ball valve having a circular body. The first and second positions are typically open and closed positions, respectively. The locking device comprises a first body half and a second body half. A hinge pivotally connects the first and second body halves together such that the locking device is positionable in open and closed positions. In the closed position, the body halves define an internal chamber.

A body opening is formed in the first and second body halves. The body opening is sized to receive the valve body in the closed position of the locking device. The body opening is typically generally circular shaped to receive circular valve bodies.

A first handle opening is formed in at least one of the first and second body halves. The first handle opening is sized to (i) receive the valve handle; and (ii) substantially prevent the handle from being rotated, in the first position of the handle, when the locking device is closed. The first handle opening is typically shaped to generally match the shape of the valve handle.

A second handle opening is formed in each of the first and second body halves. The second handle openings are typically substantially transverse to the first handle openings. The second handle openings are sized to (i) receive the valve handle, and (ii) substantially prevent the handle from being rotated, in the second position of the handle, when the locking device is closed. The second handle openings are also typically shaped to generally match the shape of the valve handle.

The chamber is sized such that the valve handle extends exteriorly through the first and second handle openings in the first and second positions of the handle, respectively. The handle position can be readily seen in both positions.

A locking means is provided on the first and second body halves to retain the locking device in the closed position. The first body half comprises a first locking portion, and the second body half comprises a second locking portion. The locking portions form a snap-fit engagement in the closed position of the locking device.

At least one aperture is formed in each of the first and second locking portions. Each aperture in the first locking portion is aligned with an aperture in the second locking portion in the closed position of the locking device. The aligned pairs of apertures can each receive a lock to prevent opening and removal of the locking device from the valve without damaging the locking device and leaving visual evidence of tampering.

DRAWINGS

These and other features, aspects and advantages of the present invention will become better understood from the following description, appended claims and accompanying drawings, in which:

FIG. 1 is a front- perspective view showing a locking device according to the present invention in a closed position mounted on a ball valve having a handle in the open position;

FIG. 2 is a front perspective view of the locking device of FIG. 1 in an opened position;

DESCRIPTION

Figure 3:
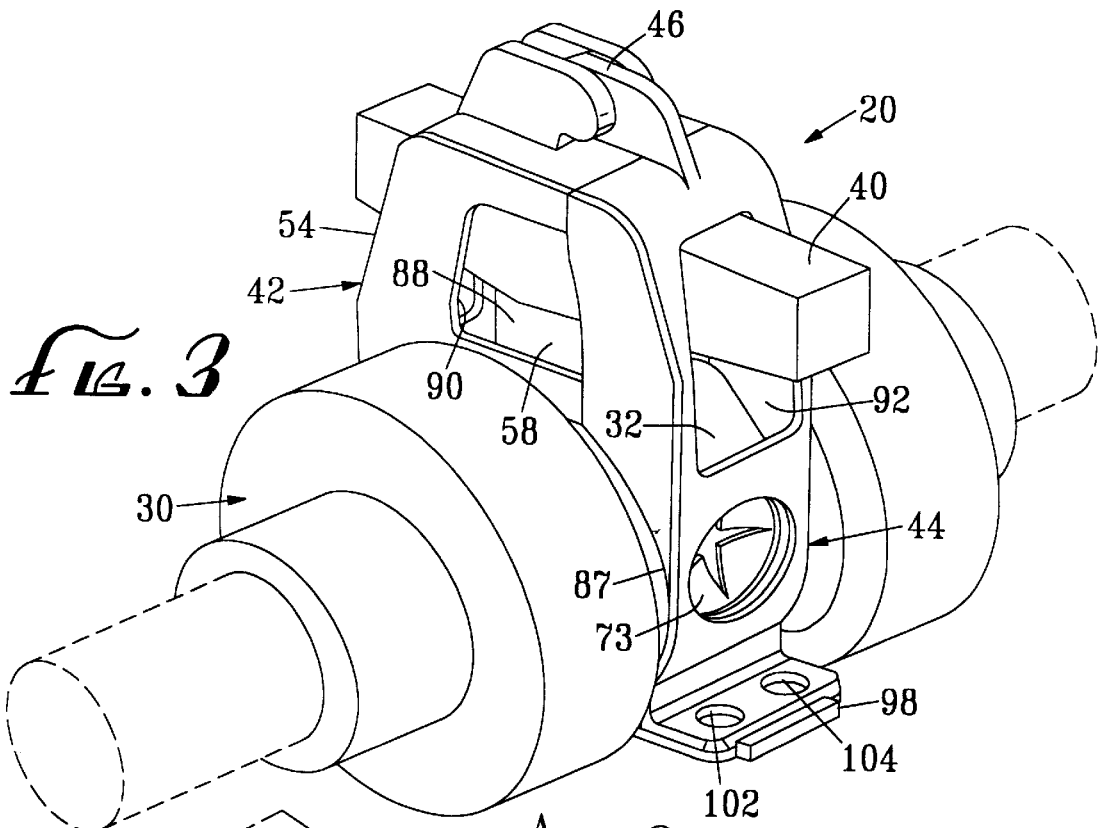
FIG. 3 is a front perspective view showing the locking device of FIG. 1 installed on the ball valve, with the valve handle in the closed position.

The present invention is a locking device 20 as illustrated in FIGS. 1–5. The locking device 20 is shown in FIG. 1 in a closed position mounted to a valve 30. The valve 30 is a true-union ball valve having a cylindrical body 32, a pair of threaded union nuts 34 on the body 32, and end connectors 36 sized for coupling to fluid conduits 38. An upstanding rotatable on/off handle 40 is provided on the body 32. The handle 40 is shown in a first, open position of the valve 30. The valve 30 is typically comprised of polyvinyl chloride (PVC) or chlorinated polyvinyl chloride (CPVC). The handle 40 can be formed of the same material as the remainder of the valve 30, or a different material such as high-density polypropylene.

FIG. 2 illustrates the locking device 20 in an open position. The locking device 20 comprises a first body half 42 and a second body half 44 connected to the first body half 42 by a hinge 46 disposed at the top end of the locking device 20. The first body half 42 comprises a wall 48 including a front face 50, a rear face 52, a side face 54, a bottom face 56 and a top face 61. An inwardly depressed, slotted, resilient region 55 is formed in the side face 54. As shown, the bottom face 56 is comprised of an arcuate shaped portion 57 and a planar portion 59. A first handle opening 58 is formed in the front face 50 and extends from the inner edge 60. A first handle opening 62 of substantially the same size and shape is also formed in the rear face 52 in alignment with the first handle opening 58. The first handle openings 58, 62 are typically shaped to generally match the shape of the valve handle 40.

The second body half 44 comprises a wall 64 including a front face 66, a rear face 68, a side face 70 connecting the front face 66 and the rear face 68, and a top face 72. An inwardly depressed, slotted, resilient region 73 is formed in the side face 70.

Figure 4:
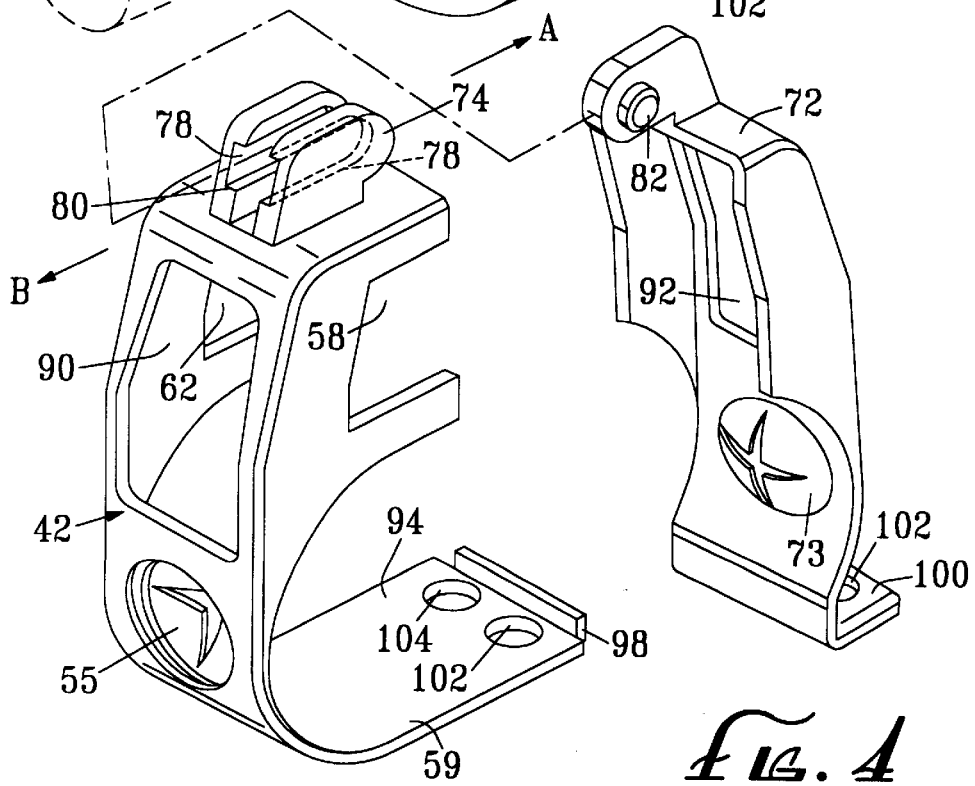
FIG. 4 is an exploded perspective view showing the manner of engaging the hinge portions to connect the body halves.

Referring to FIG. 4, the hinge 46 comprises a first hinge portion 74 on the top face 61 of the first body half 42, and a second hinge portion 76 on the top face 72 of the second body half 44. The first hinge portion 74 defines a pair of parallel channels 78 having opened ends 80, and the second hinge portion 76 includes a pair of protuberances 82 on opposite sides of the second hinge portion 76 (only one protuberance 82 is shown) each sized to fit within one of the channels 78. The second hinge portion 44 is attached to the first hinge portion 42 by inserting the protuberances 82 into the channels 78 at the opened ends 80 and then sliding the protuberances 82 along the channels 78 in the direction of arrow A until a retaining engagement is achieved. To disengage the first and second hinge portions 74, 76 from each other, the protuberances 82 are removed from the channels 78 in the direction of arrow B. The disengageable hinge 46 enables the body halves 42, 44 to be disconnected from each other to allow the locking device 20 to be installed on valves located-in tight spaces as described below.

Figure 5:
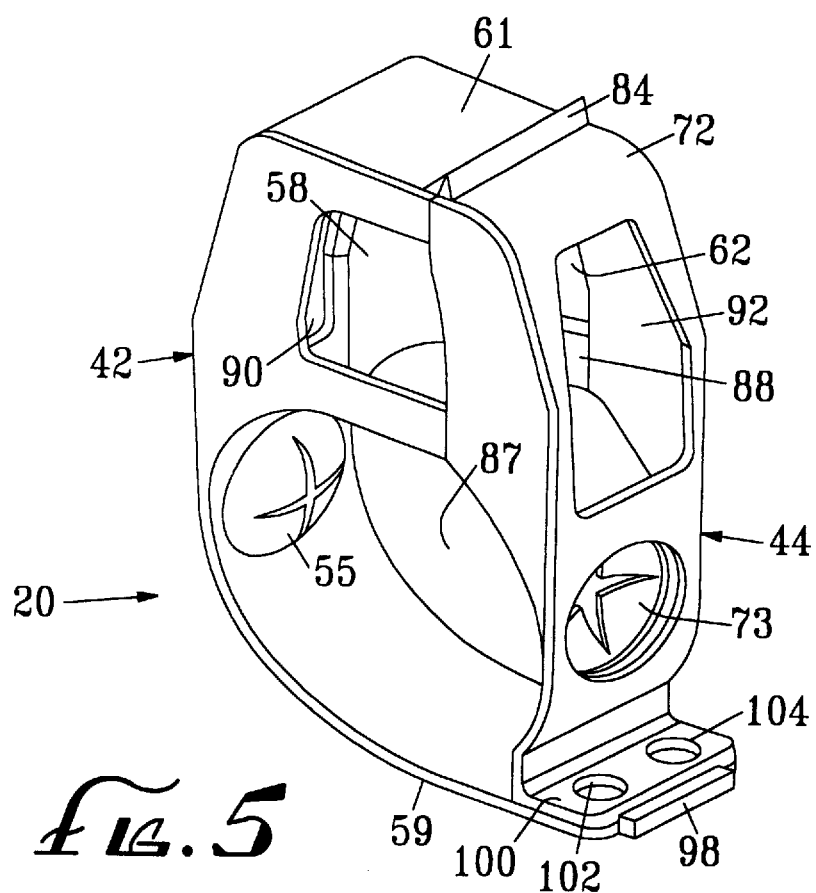
FIG. 5 illustrates an alternate embodiment of the locking device according to the present invention having a one-piece construction.

As shown in FIG. 5, the hinge can optionally be a "living hinge" 84 formed integral with the body halves 42, 44. This one-piece construction of the locking device 20 eliminates the need to assemble multiple components during manufacturing.

In the closed position of the locking device 20 shown in FIG. 1, the inner edge 60 of the first body half 42 abuts the inner edge 86 of the second body half 44 (FIG. 2), and the body halves 42, 44 define a valve body opening 87 and an interior chamber 88. The valve body opening 87 is typically generally circular shaped as shown to generally correspond to the shape of the valve body 32. The first handle openings 58, 62 are sized and shaped to receive the handle 40 in the illustrated first, open position of the valve 30, and to substantially prevent the handle 40 from being rotated from this position. The chamber 88 is sized such that the handle 40 extends exteriorly of the front faces 50, 66 and the rear faces 52, 68, of the body halves 42, 44, respectively, and is readily visible. The valve handle 40 can be colored a bright color such as red to enhance its visibility.

As shown in FIG. 2, a pair of second handle openings 90, 92 are also formed through the side face 54, 70 of the first body half 42 and the second body half 44, respectively. The second handle openings 90, 92 are typically substantially transverse to the first handle openings 58, 62. The second handle openings 90, 92 are sized and shaped to receive the handle 40 in the second, closed position of the valve 30 as shown in FIG. 3, and to substantially prevent the handle 40 from being turned from this position. The chamber 88 is sized such that the handle 40 extends exteriorly from the side faces 54, 70 of the body halves 42, 44, respectively, and is readily visible in the second position also.

The locking device 20 comprises locking means for retaining the locking device 20 in the closed position on the valve 30. Particularly, the first body half 42 includes a first locking portion 94 at the bottom face 56. The first locking portion 94 includes the planar portion 59 and an upstanding portion 98 at an end of the planar portion 59. The second body half 44 includes a planar second locking portion 100 which automatically forms a snap-fit engagement with the first locking portion 94 in the closed position of the locking device 20 as shown in FIGS. 1, 3 and 5. The locking means enables individuals to have both hands free for performing operations on the valve 30. Referring to FIG. 1, to disengage the locking means, a downward force is applied to the upstanding portion 98 in the general direction of arrow C to disengage the first and second locking portions 94, 100 from each other.

At least one and, preferably, two apertures 102, 104 are formed through each of the locking portions 94, 100, such that the locking portions define at least one pair of aligned apertures 102, 104, in the closed position of the locking device 20. The pairs of apertures 102, 104 are each sized to receive a conventional lock (not shown) in the closed position, to prevent removal of the locking device 20 from the valve 30 without permanently damaging the locking device 20 and leaving visual evidence of tampering.

Two pairs of apertures 102, 104 are preferably provided so that two locks can be used on the locking device 20 for enhanced security against unauthorized changing of the handle setting. For example, two locks requiring different keys or combinations can be installed on the locking device 20 by two separate individuals. Removal of both locks to change the handle setting requires that one individual have both keys or combinations, or that both individuals be simultaneously present at the locking device 20. Thus, one individual normally cannot remove both locks and turn the handle without the authorization of the other individual.

The hinge 46 construction prevents the first and second hinge portions 74, 76 from being disengaged from each other in the closed position of the locking device 20. Particularly, referring to FIG. 1, because the inner edges 60, 86 of the first and second body halves 42, 44, respectively, abut each other in the closed position, it is not possible by applying a force to the second body half 44 in the direction of arrow D, generally in the direction of the length of the channels 78 in the first hinge portion 74, to force the protuberances 82 on the second hinge portion 76 out of the channels 78.

The locking device 20 has a compact construction that allows it to be installed on valves located near walls, valve boxes and other common obstacles. Referring to FIGS. 1 and 3, the locking device 20 is preferably configured such that the side faces 54, 70 of the respective body halves 42, 44 are proximate to the valve body 32 in the closed position. The locking device 20 is typically installed on the valve 30 in a tight space by first disconnecting the body halves 42, 44 by disengaging the first and second hinge portions 74, 76 from each other. With the handle 40 in the first position shown in FIG. 1, the first body half 42 is positioned on the side of the valve 30 that faces the obstacle and then fitted on the valve 30 in the general direction of arrow E so that the handle 40 extends through the first handle openings 58, 62. With the handle 40 in the second position shown in FIG. 3, the first body half 42 is fitted on the valve 30 such that the handle 40 extends through the second handle opening 90. Next, the hinge portions 74, 76 are reengaged to reconnect the body halves 42, 44. The second body half 44 is rotated toward the first body half 42 to the closed position of the locking device in which the locking portions 94, 100 automatically engage. The handle 40 also extends exteriorly through the second handle opening 92 in the second position of the handle 40 shown in FIG. 3. In this closed position, the locking device 20 normally cannot be accidentally dislodged from the valve 30. That is, to open the locking device 20, a downward force needs to be applied to the upstanding portion 98 to disengage the respective first and second locking portions 94, 100. One or more locks can then be inserted through the apertures 102, 104 to prevent removal of the locking device 20 from the valve 30.

The locking device 20 is typically formed of a high-density polypropylene. High-density polypropylenes are typically characterized as having a relative density of at least about 0.94. This material has sufficient flexibility to enable the locking portions 94, 100 to automatically form a snap-fit engagement in the closed position. In addition, this material provides resistance to chemical attack by various chemicals such as acids, alkalines and petroleum-based fluids.

The locking device 20 can optionally be formed of other plastic materials such as PVC, CPVC, polyethylene, and "HALAR", a fluoropolymer commercially available from AUSIMONT of Morristown, N.J.

The locking device 20 can be installed on various types of ball valves such as true union, single entry, compact and utility ball valves, having a body of approximately the same outer shape and diameter to fit within the body opening 87, and having a handle spaced about the same distance from the body so that the handle fits within the first handle openings 58, 62 and the second handle openings 90, 92, in the first and second positions of the handle, respectively. The depressed regions 55, 73 in the respective side faces 54, 70 are sufficiently resilient to assert a compressive force on the valve body and compensate for minor valve body diameter changes of different types of ball valves on which the locking device 20 is installed in the closed position, to retain the locking device 20 more firmly on valves.

Although the present invention has been described in considerable detail with reference to certain preferred embodiments thereof, other embodiments are possible. Therefore, the scope of the appended claims should not be limited to the description of the preferred embodiments contained herein.

What is claimed is:

1. A locking device for use on a valve including a body and a handle on the body rotatable to first and second positions, the locking device comprising:
    a) a first body half;
    b) a second body half;
    c) a hinge pivotally connecting the first body half to the second body half such that the locking device is positionable in open and closed positions, the first and second body halves defining an interior chamber in the closed position;
    d) a body opening formed through each of the first and second body halves, the body openings being sized to receive the valve body in the closed position;
    e) a first handle opening formed in at least one of the first and second body halves, the first handle opening being sized to (i) receive the valve handle, and (ii) substantially prevent the handle from being rotated, in the first position of the handle, when the locking device is in the closed position; and
    f) a second handle opening formed in each of the first and second body halves, the second handle openings being sized to (i) receive the valve handle, and (ii) substantially prevent the handle from being rotated, in the second position of the handle, when the locking device is in the closed position;
    g) wherein the chamber is sized such that the handle extends through the first and second handle openings exteriorly of the first and second body halves, in the closed position.

2. The locking device of claim 1, further comprising locking means on the first and second body halves for retaining the locking device in the closed position, the locking means being automatically actuated by positioning the locking device in the closed position.

3. The locking device of claim 2, wherein the locking means defines at least one aperture therethrough, each aperture being sized to receive a lock in the closed position to prevent removal of the locking device from the valve.

4. The locking device of claim 1, wherein the hinge is disposed at a top surface of each of the first and second body halves, the hinge and the first and second handle openings being disposed on the same side of the body opening.

5. The locking device of claim 4, wherein the hinge comprises a first hinge portion on the first body half and a second hinge portion on the second body half, the first and second hinge portions are (i) selectively disengageable from each other in the open position to disconnect the first and second body halves, and (ii) non-disengageable from each other in the closed position.

6. The locking device of claim 1, wherein the hinge is formed integral with the first and second body halves.

7. The locking device of claim 1, wherein the side faces of the first and second body halves each include an inwardly depressed, resilient region sized to contact the valve body in the closed position.

8. A locking device for use on a valve including a body and a handle on the body rotatable to first and second positions, the locking device comprising:
   a) a first body half;
   b) a second body half;
   c) a hinge pivotally connecting the first body half to the second body half such that the locking device is positionable in open and closed positions, the first and second body halves defining an interior chamber in the closed position;
   d) locking means on the first and second body halves for retaining the locking device in the closed position, the locking means being automatically actuated by positioning the locking device in the closed position;
   e) a body opening formed through each of the first and second body halves, the body openings being sized to receive the valve body in the closed position;
   f) a first handle opening formed in at least one of the first and second body halves, the first handle opening being sized to (i) receive the valve handle, and (ii) substantially prevent the handle from being rotated, in the first position of the handle, when the locking device is in the closed position; and
   g) a second handle opening formed in each of the first and second body halves substantially transverse to the first handle opening, the second handle opening being sized to (i) receive the valve handle, and (ii) substantially prevent the handle from being rotated, in the second position of the handle, when the locking device is in the closed position;
   h) wherein the chamber is sized such that the handle extends through the first and second handle openings exteriorly of the first and second body halves in the closed position.

9. The locking device of claim 8, wherein the hinge comprises a first hinge portion on the first body half and a second hinge portion on the second body half, the first and second hinge portions are (i) selectively disengageable from each other in the open position to enable the first and second body halves to be disconnected, and (ii) non-disengageable from each other in the closed position.

10. The locking device of claim 8, wherein the locking means defines at least one aperture, each aperture being sized to receive a lock in the closed position to prevent removal of the locking device from the valve.

11. A locking device for use on a valve including a body and a handle on the body rotatable to first and second positions, the locking device comprising:
   a) a first body half including a front face, a rear face opposite the rear face, a side face connecting the front face and the rear face, a top face and a bottom face;
   b) a second body half including a front face, a rear face opposite the front face, a side face connecting the front face and the rear face, and a top face;
   c) a hinge pivotally connecting the first body half to the second body half such that the locking device is positionable in open and closed positions, the first and second body halves defining an interior chamber in the closed position;
   d) a body opening formed through the front and rear faces of each of the first and second body halves, the body opening being sized to receive the valve body in the closed position;
   e) a first handle opening formed through the front and rear faces of at least one of the first and second body halves, the first handle opening being sized to (i) receive the valve handle, and (ii) substantially prevent the handle from being rotated, in the first position of the handle, when the locking device is in the closed position; and
   f) a second handle opening formed through the side faces of each of the first and second body halves, the second handle opening being sized to (i) receive the valve handle, and (ii) substantially prevent the handle from being rotated, in the second position of the handle, when the locking device is in the closed position;
   g) wherein the chamber is sized such that the handle extends exteriorly through the first and second handle openings in the closed position.

12. The locking device of claim 11, further comprising locking means on the first and second body halves for retaining the locking device in the closed position, the locking means being automatically actuated by positioning the locking device in the closed position.

13. The locking device of claim 11, wherein the bottom face of the first body half comprises a first locking portion which extends outwardly beyond the side face of the second body half in the closed position, the second body half comprises a second locking portion which extends outwardly at a bottom end of the side face, the first locking portion being configured to automatically engage the second locking portion in the closed position.

14. The locking device of claim 13, wherein the first and second locking portions each define at least one aperture therethrough, each aperture in the first locking portion being aligned with an aperture in the second locking portion in the closed position, the aligned apertures being sized to receive a lock to prevent removal of the locking device from the valve.

15. The locking device of claim 11, wherein the hinge is disposed at the top face of each of the first and second body halves, and the hinge and the first and second handle openings are disposed on the same side of the body opening.

16. The locking device of claim 15, wherein the hinge comprises a first hinge portion on the top face of the first body half and a second hinge portion on the top face of the second body half, the first and second hinge portions are (i) selectively disengageable from each other in the open position to enable the first and second body halves to be disconnected, and (ii) non-disengageable from each other in the closed position.

17. The locking device of claim 16, wherein the first and second body halves are sized such that the side faces of the first and second body halves are proximate to the valve body in the closed position of the locking device.

18. The locking device of claim 15, wherein the hinge is formed integral with the first and second body halves.

19. In combination:
   a) a valve, comprising:
      i) a body; and
      ii) a handle on the body, the handle being rotatable to first and second positions; and
   b) a locking device, comprising:
      i) a first body half;
      ii) a second body half;
      iii) a hinge pivotally connecting the first body half to the second body half such that the locking device is positionable in open and closed positions, the first and the second body halves defining an interior chamber in the closed position;
      iv) a body opening formed in each of the first and second body halves, the body opening being sized to receive the valve body in the closed position;
      v) a first handle opening formed in at least one of the first and second body halves, the first handle opening being sized to (i) receive the valve handle, and (ii) substantially prevent the handle from being rotated, in the first position of the handle, when the locking device is in the closed position; and
      vi) a second handle opening formed in each of the first and second body halves substantially transverse to the first handle opening, the second handle opening being sized to (i) receive the valve handle, and (ii) substantially prevent the handle from being rotated, in the second position of the handle, when the locking device is in the closed position;
      vii) wherein the chamber is sized such that the handle extends through the first and second handle openings exteriorly of the walls of the first and second body halves in the closed position.

20. The combination of claim 19, wherein the valve is a ball valve.

21. The combination of claim 19, further comprising locking means on the first and second body halves for retaining the locking device in the closed position, the locking means being automatically actuated by positioning the locking device in the closed position.

22. The combination of claim 21, wherein the locking means defines at least one aperture therethrough, each aperture being sized to receive a lock in the closed position to prevent removal of the locking device from the valve.

23. The combination of claim 19, wherein the hinge is disposed at a top surface of each of the first and second body halves, and the hinge and the first and second handle openings are disposed on the same side of the body opening.

24. The combination of claim 23, wherein the hinge comprises a first hinge portion on the first body half and a second hinge portion on the second body half, the first and second hinge portions are (i) selectively disengageable from each other in the open position to disconnect the first and second body halves, and (ii) are non-disengageable from each other in the closed position.

25. The combination of claim 19, wherein the first and second body halves are sized such that the side faces of each of the first and second body halves are proximate to the valve body in the closed position.

26. The locking device of claim 19, wherein the hinge is formed integral with the first and second body halves.

* * * * *

UNITED STATES PATENT AND TRADEMARK OFFICE
CERTIFICATE OF CORRECTION

PATENT NO. : 5,806,555
DATED : September 15, 1998
INVENTOR(S) : Jose D. Magno, Jr.

It is certified that error appears in the above-identified patent and that said Letters Patent is hereby corrected as shown below:

Column 3, line 24, delete "hyphen" after "front."
Column 4, line 27, delete "hyphen" after "located."
Column 5, line 48, delete "5" after "first."

Signed and Sealed this

Thirtieth Day of March, 1999

Q. TODD DICKINSON

Attest:

Attesting Officer

Acting Commissioner of Patents and Trademarks